United States Patent Office.

H. L. HOUGHTON, OF MORRISON, ILLINOIS.

Letters Patent No. 65,674, dated June 11, 1867.

---

IMPROVED COMPOSITION FOR HARDENING AND PRESERVING WOOD.

---

The Schedule referred to in these Letters Patent and making part of the same.

---

TO ALL WHOM IT MAY CONCERN:

Be it known that I, H. L. HOUGHTON, of Morrison, in the county of Whiteside, and State of Illinois, have invented a new and useful Improvement in Preserving Timber; and I do hereby declare that the following is a full, clear, and exact description thereof, which will enable others skilled in the art to fully understand and make use of the same.

I am aware that various plans and processes have been devised for the purpose of preserving wood and timber from decay, but either owing to defective materials or the cost of the process no plan hitherto devised has been generally adopted by the public.

My invention consists in forming a composition, hereinafter described, by which I am enabled to render the softest and most worthless wood suitable for almost any purpose. All kinds of wood are rendered impervious to water, and consequently protected from decay, from rot, while at the same time worms and insects usually so destructive will not touch it. The lightest and most spongy woods are rendered as heavy and hard as oak, and rendered nearly as valuable for a great variety of purposes. In carrying out my improvement I form a composition of equal parts of alum, saltpetre, and green vitriol.

The mode of preparing the composition is as follows: Place as much of the composition in warm water as the water will dissolve, and then saturate the wood with this solution or liquid until the wood is thoroughly charged. The liquid will penetrate the wood, filling the pores, and rendering it solid and hard, as before stated.

Having thus described my invention, what I claim as new, and desire to secure by Letters Patent, is—

A wood-preserving composition formed of the ingredients herein named, and in about the proportions mentioned, and applied to wood substantially as herein described.

The above specification of my invention signed by me this 21st day of December, 1866.

H. L. HOUGHTON.

Witnesses:
O. E. Fox,
J. McDonald.